Figure 1:
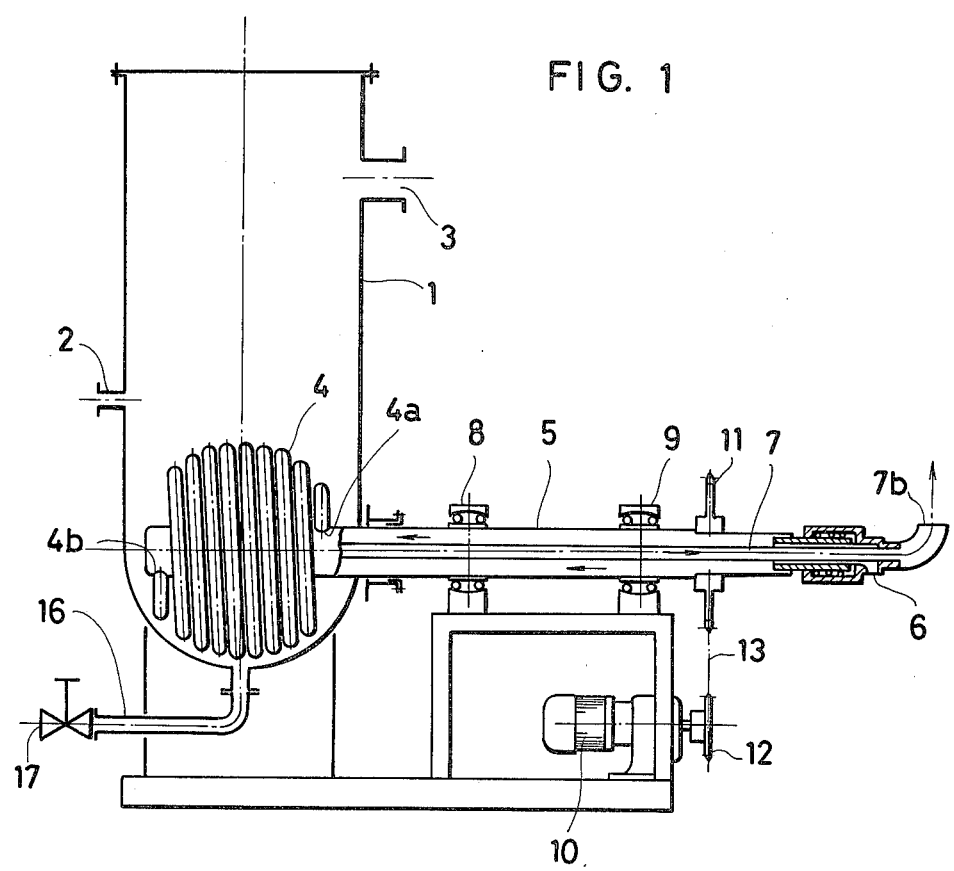

United States Patent [19]

Nakamura et al.

[11] 4,377,202

[45] Mar. 22, 1983

[54] ROTARY HEAT EXCHANGE APPARATUS PROVIDED WITH A SPHERICALLY COILED HEAT TRANSFER TUBE

[75] Inventors: Nobunosuke Nakamura, Nara; Hisanori Kimoto, Kitakyushu, both of Japan

[73] Assignees: Fuji Kosan Kabushiki Kaisha, Kitakyushu; Seiwa Ltd., Osaka, both of Japan

[21] Appl. No.: 267,114

[22] Filed: May 26, 1981

[51] Int. Cl.³ .................... F28D 11/04; F28F 5/06
[52] U.S. Cl. .................... 165/86; 165/92; 159/25 A; 159/25 R
[58] Field of Search .............. 165/87, 88, 92; 159/25 R, 25 A; 34/179, 182, 183, 1 C

[56] References Cited

U.S. PATENT DOCUMENTS

| | | | |
|---|---|---|---|
| 1,869,706 | 8/1932 | Morrow | 165/92 |
| 2,654,364 | 10/1953 | Hertrich | 165/92 |
| 3,009,683 | 11/1961 | Grieselhuber | 165/92 |
| 3,486,740 | 12/1969 | Christian | 165/87 |

FOREIGN PATENT DOCUMENTS 318 of 1899 Fed. Rep. of Germany ... 159/25 A

Primary Examiner—William R. Cline
Assistant Examiner—Theophil W. Streule, Jr.
Attorney, Agent, or Firm—Flynn, Thiel, Boutell & Tanis

[57] ABSTRACT

A rotary heat exchanger characterized in that a spherically coiled heat transfer bypass tube is provided concentrically about a reflux type heat transfer double-tube at a part thereof, the outer tube of the double tube being rotatable, wherein a suction tube is provided around the outer tube within the spherical space defined by the bypass tube, said suction tube incasing screw vanes secured to the outer periphery of the outer tube, whereby convection is induced within the spherical space by the rotation of the outer tube. With the exchanger, good heat exchange efficiency is attainable without scaling.

3 Claims, 2 Drawing Figures

ROTARY HEAT EXCHANGE APPARATUS PROVIDED WITH A SPHERICALLY COILED HEAT TRANSFER TUBE

This invention relates to a rotary heat exchange apparatus of a double-tube construction, the concentric tubes serving as a rotary shaft as well, and more particularly to a rotary heat exchanger which is provided with a spherically coiled heat transfer bypass tube formed by spirally coiling an elongate tube about a part of the outer tube of the double-tube so that it has a spherical shape.

Heat exchangers are at present being put into practical use in a wide variety of fields ranging from air conditioning to evaporation and distillation.

As a heat transfer tube to be used in such heat exchangers, there is generally known a unidirectional heat transfer tube through which a heat transfer medium flows in one direction thereby causing heat exchange between the medium and a fluid outside the tube, and a reflux type heat transfer tube of a double-pipe (tube-in-tube) construction in which a heat transfer medium is passed through the outer tube and then refluxed through the inner tube.

The unidirectional heat transfer tube above is constructed to have an increased heat transfer area by providing fins on the external periphery of the tube body. In the case of the reflux type heat transfer tube, its heat transfer characteristics are profoundly affected by the temperature difference between the heat transfer medium passing through the inner tube and the heat transfer medium passing through the space between the inner and outer tubes. Therefore, it is essential to cause effective heat dissipation by minimizing such influence rather than to increase the heat transfer area by the provision of fins, which would not be very effective.

If the unidirectional heat transfer tube is, for example, utilized in an evaporator and disposed inside the kettle, it would be not only disadvantageous with respect to the efficiency of heat exchange, but also would require an excessively troublesome arrangement so that it would not be suitable for that use. For this reason, a reflux type heat transfer tube of a double-pipe system as mentioned above is used for the heat transfer of a liquid or gaseous fluid (hereinafter simply referred to as a fluid) existing within a processing plant such as an evaporator, taking into account the necessity of disposing fixedly a heat transfer tube inside the kettle. However, in this case, there is only a little movement of a fluid in the liquid phase or gas phase inside the kettle, so that scale depositing from the fluid in the kettle is likely to be attached on the periphery of the heat transfer tube. As a consequence, there is danger that the scaling phenomenon will lead to super-heating of the fluid because of stagnation of the fluid around the scale as well as the lowering in heat transfer efficiency.

In order to prevent stagnation of the fluid in the evaporator kettle, it is of course conceivable to use an agitator or pump, but the provision of such an additional device to the heat transfer tube is not preferable from an economic viewpoint, and it renders the apparatus more complicated, and is not very effective.

Accordingly, an object of this invention is to provide a heat exchange apparatus which has good heat transfer efficiency and does not cause scale to be formed on the heat transfer surfaces when it is used within a processing plant such as an evaporator kettle for the heat exchange of a fluid existing therein.

Another object of this invention is to provide a heat exchange apparatus with a heat transfer tube that is constructed to be rotatable and in which a large relative velocity between the flow velocity of a heat exchange fluid and the rotational velocity of the heat transfer tube is maintained in order to substantially enhance the heat exchange effect.

A further object of this invention is to provide a heat exchange apparatus in which convection is caused in a fluid to be subjected to heat exchange around the heat transfer tube thereby preventing the stagnation of the fluid and improving the heat exchange performance.

Thus, the invention has an ultimate object of providing a rotary heat exchanger capable of high-speed rotation with extremely low power and with little occurrence of vibration by achieving the objects set forth above.

The objects of the invention noted above have been achieved by a rotary heat exchange apparatus which comprises a heat transfer bypass tube that is spirally coiled or convoluted concentrically about a reflux type heat transfer tube of a double-tube (tube-in-tube) construction at a lengthwise portion of this double-tube so as to assume a spherical shape, the outer tube of said double-tube being rotatable, and inside the spherical space enveloped by said spherically coiled heat transfer bypass tube, a suction tube is provided concentrically around the outer tube of said heat transfer double-tube, said suction tube, if required, encasing screw vanes releasably secured to the outer periphery of the outer tube therein, whereby said spherically coiled heat transfer bypass tube is made integral with said suction tube, and said bypass tube and said suction tube are integratedly rotatable coaxially about the axis of the outer tube in conformity with the rotation of the outer tube.

Figure 2:
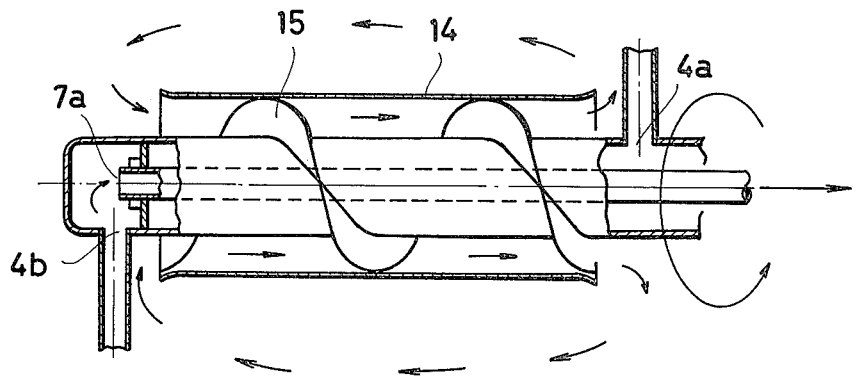

The invention will be hereinafter described in greater detail in conjunction with preferred embodiments with reference to the accompanying drawings, in which:

FIG. 1 is an elevational view in partly cutaway cross-section of one embodiment of the heat exchanger according to this invention applied to an evaporator; and FIG. 2 is a partial enlarged view of the embodiment shown in FIG. 1 illustrating the portion of the suction tube enveloped by the bypass tube.

With reference to FIGS. 1 and 2, an embodiment is shown in which a heat exchanger of this invention is used in an evaporator. The reference numeral 1 designates an evaporator kettle which is a round-bottomed, generally cylindrical kettle. The evaporator kettle 1 comprises a feed opening 2 positioned midway on the cylindrical wall through which opening a fluid to be evaporated is introduced, an evaporating vapor outlet 3 positioned on the cylindrical wall above the feed opening 2 and a spherically coiled heat transfer bypass tube 4 disposed on the bottom which constitutes an essential part of a heat exchanger of this invention.

The heat exchange apparatus is mainly comprised of a double-tube portion and a portion of the aforesaid spherically coiled bypass tube, a part of said double-tube portion being enveloped in said bypass tube portion.

The double-tube portion comprises an outer tube 5 which is closed at its front end and provided with a heat-transfer-medium inlet 6 at its rear end, and an inner tube 7 concentrically encased in the outer tube. The inner tube 7 has an opening 7a at its front end. The opening 7a is located near the front end of the outer tube 5 a gap or aperture is defined by the front end of the outer tube and an annular partition surrounding said front opening 7a, said gap constituting a passage through which the heat transfer medium enters the inner tube 7. The rearward end of inner tube 7 terminates at a heat-transfer-medium outlet 7b, extending beyond the rear end of the outer tube 5. The outer tube 5 is rotatably journaled or mounted in a pair of bearings 8, 9 mounted on a base of the apparatus and is adapted to be rotated by a suitable driving means, for example a driving transmission device comprising a drive motor 10, sprocket wheels 11, 12 and a chain 13.

The portion of the spherically coiled heat transfer bypass tube 4 disposed in the bottom area of the kettle is formed by spirally coiling or convoluting a tube concentrically around the outer tube 5 in a spherically-contoured form, one end 4a thereof communicating with the outer tube 5 and the other end 4b thereof communicating with the aforementioned gap and, accordingly, the inner tube 7. Thus the tube 4 constitutes a bypass passage through which the heat-transfer-medium is routed. It is essential that the bypass passage should be shaped as a spherical convolution form as described, so that various effects as will be described hereinbelow can be attained.

Within the spherical space enveloped or bounded by the spherically coiled heat transfer tube 4, a suction tube 14 for causing convection in a heat exchange fluid existing near the outer tube is provided securely to the outer tube as shown in FIG. 2. The suction tube 14 encases a screw vane 15 which is detachably secured to the outer periphery of the outer tube 5.

The screw vane 15 may be either attached to or detached from the periphery of the outer tube 5 depending upon the purposes and properties of the heat exchange fluid. For example, concentration of a syrup solution can be achieved satisfactorily without attaching the screw vane. In concentrating active sludge, slurry, chinese medicines, etc., a product of a higher concentration can be obtained by attaching the screw vane than in the case where the screw vane is not attached.

Both the suction tube 14 and the screw vane 15 rotate in company with the outer tube 5 when it is revolved, the outer tube serving as a rotational shaft.

The reference numeral 16 is a drain discharge tube joined to the bottom of the kettle and the reference numeral 17 is a drain discharge valve.

With the heat exchanger of this invention thus described, its operation and function will be now explained.

When a fluid to be subjected to heat exchange is supplied into the kettle 1 and a heat transfer medium is routed from the inlet 6 through the heat transfer tube, the heat exchanger becomes ready for actuation. Concurrently with the supply and routing processes, the outer tube 5 is revolved by means of the driving motor 10. At the same time, the screw vane 15, the suction tube 14 and the spherically coiled heat transfer bypass tube 4 are also revolved in unison about the axis of the outer tube 5, since they are integral with the outer tube.

In this process, the heat transfer medium in part passes through the outer tube up to its front end and the remainder flows into the heat transfer bypass tube 4, but is eventually routed through the spherically convoluted bypass tube to reach the outlet opening 4b where it is routed via the front end opening 7a through the inner tube 7 and is finally withdrawn through the heat-transfer-medium outlet 7b.

During the reflux process of the heat transfer medium, the fluid contained in the kettle 1 is heat exchanged by the heat dissipated from the outer tube 5 and the heat dissipated from the spherically coiled heat transfer bypass tube 4, evaporates into vapor, and is then expelled out of the system through the vapor outlet 3. The fluid within the space bounded by the spherically-contoured tube 4 undergoes, during this process, convection action created by the rotation of the outer tube 5, as shown in FIG. 2 by the arrow lines. In other words, the rotation of the outer tube 5 causes the suction tube 14 to rotate and, as a result, draws the fluid near the suction tube rearwardly and circulates it by means of the screw vane 15. Furthermore, the rotation of the outer tube 5 generates centrifugal force, which prevents solid substances in the fluid from depositing out of the fluid and attaching to the heat transfer tube.

In this way, the occurrence of scaling on the heat transfer tube is substantially precluded by the centrifugal force of the spherically coiled heat transfer tube and the convection action of the suction tube, and in addition, stagnation of the fluid is avoided thus enhancing heat transfer efficiency.

The embodiment as shown in FIG. 1 and described above is directed to the embodiment wherein the invention apparatus is transversely applied to an evaporator kettle, the rotation axis thereof being transverse, but the heat exchanger of the invention may also be used longitudinally relative to the rotation axis, and may also be used satisfactorily for a wide variety of application, for example, in a cooler, crystallizer, reactor, still, and the like.

When the heat exchanger of this invention is utilized in a cooling crystallizer, a refrigeration medium is routed through the heat exchanger. Because of the rotation of the spherically coiled bypass tube, a fluid flows in an ideal pattern such that fine crystalline particles, once crystallized out, are blown about by reason of the centrifugal force, redissolved, and the result is a product comprising only large particles. Thus, a slurry of a homogeneous particle size can be obtained, either in a continuous method or in a batch method.

It will be obvious to those skilled in the art that various changes or modifications may be made in this invention without departing from the spirit and scope thereof, and therefore the invention is not limited to the embodiment shown in the drawings.

In Table 1 given below, the performance of a rotary spherical coil tube evaporator practiced in accordance with this invention is listed in comparison with the performance of a prior art long-tube calandria evaporator with a force circulation system. The invention exhibits superior and unique results.

TABLE

| | Long-tube Forced Circulation Evaporator | Rotary Spherical Coil Tube Evaporator (The Invention) |
|---|---|---|
| Heating Area (ft²) | 1,184 | 300 |
| Size (ft) | Calandria: 2.9 (diameter) 19.7 (length) Shell: 7.2 (diameter) 14.8 (length) | Heat Transfer Tube: 6.9 (diameter) 7.2 (height) Shell: 7.0 (diameter) 9.3 (height) |
| Operating Pressure | −310 | −200 |

TABLE-continued

| | Long-tube Forced Circulation Evaporator | Rotary Spherical Coil Tube Evaporator (The Invention) |
|---|---|---|
| (mm $H_2O$) | | |
| Fluid Temperature (°F.) | 175 | 212 |
| Evaporation Rate (lb/hr) | 8800 (max. value) | 10,230 (constant value) |
| Overall Heat Transfer Coefficient (Btu/$ft^2$.hr.°F.) | 196 (max. value immediately after the cleaning) | 358 (constant value) |
| Drive Motor (Horse Power, HP) | 100 (circulation pump) | 10 |
| Scaling | Cleaning is required every 45 days. | None |
| Steam Drain Temperature (°F.) | 284 | 215 |
| Heat Flux (Btu/$ft^2$.hr) | 14,700 | 36,800 |
| Logarithmic Mean Temperature Difference (°F.) | 75 | 102.8 |

As is apparent from the table above, the rotary spherical coil tube evaporator according to this invention has a constant evaporation capacity whereas the conventional evaporator decreases in its overall heat transfer coefficient because of the deposition of scale, and must be cleaned every 45 days.

In particular, it is to be noted that the temperature difference between the fluid in the kettle and the steam drain according to this invention is only 3° F., in sharp contrast to about 110° F. in the case of the prior art, which makes apparent the excellent heat exchange capacity of this invention over the prior art. Thus, the evaporator according to this invention is useful as an energy-saving type of evaporator, the enthalpy of the steam being heat-transferred efficiently.

As thus far described, the heat exchange apparatus of this invention is provided with the spherically coiled or convoluted heat transfer bypass tube about a part of the heat transfer double-tube, said spherical bypass tube being rotated as well, so that not only is the heat transfer effect remarkably improved because of the increase in heat transfer area due to the spherical coil surfaces, but also deposition of scale on the surfaces is completely precluded because of centrifugal force of rotation.

Furthermore, the relative velocity of the heat exchange fluid to the heat transfer tube is so large that heat flux is enhanced greatly. There is no danger of the fluid being superheated, since there is no stagnant zone around the heat transfer tube. The heat exchange efficiency of this invention is greatly improved.

Also, because the heat transfer tube is formed in a spherical coil shape, a centripetal effect is induced, causing the exchanger to run more smoothly with less vibration and with no danger of run-out of the rotational axis.

The zone surrounding the spherical coil heat transfer bypass tube is enveloped in a violent whirling flow, and hence, a slight torque is required for the rotation.

Since mechanical sealing is possible, the apparatus of the invention is applicable to a wide range of pressures extending from high vacuum, e.g. $10^{-3}$ torr, to high pressure, e.g. 100 atm, with a good continuous running durability.

What is claimed is:

1. In a heat exchange apparatus for heating or cooling a fluid which comprises: a vessel; a rotary heat exchanger within said vessel, said rotary heat exchanger comprising a reflux-type, heat transfer, double-tube comprising an outer tube which is closed at the front end thereof and has a heat-transfer-medium inlet at the rear end thereof, an inner tube provided concentrically within said outer tube, the front end of said inner tube having an opening located near the closed front end of said outer tube, said outer tube having an annular partition around said opening, the rear end of said inner tube extending beyond the rear end of said outer tube and defining a heat-transfer-medium outlet, driving means for rotating said outer tube, a spherically coiled heat transfer bypass tube provided concentrically around said outer tube along a lengthwise part thereof, one end of said bypass tube communicating with said outer tube at a location upstream of said partition, the other end of said bypass tube communicating with said opening of said inner tube located near the front end of said outer tube, said spherically coiled heat transfer bypass tube being formed by spirally coiling or convoluting an elongated tube concentrically around said outer tube in a spherically-contoured shape, and a suction tube mounted concentrically on and surrounding said outer tube, said suction tube being open at its opposite ends and being located within the spherical space enveloped by said spherically coiled heat transfer bypass tube, said suction tube and said spherically coiled heat transfer bypass tube being integral with said outer tube so as to rotate in unison therewith, whereby a heat transfer medium can flow in series through said outer tube, said spherically coiled bypass tube and said inner tube, in that order.

2. A heat exchange apparatus as claimed in claim 1, including screw vane means disposed between said suction tube and said outer tube and being detachably attached to the external periphery of said outer tube.

3. A heat exchange apparatus as claimed in claim 1, wherein the diameter of said spherically coiled heat transfer bypass tube is substantially the same as that of said inner tube.

* * * * *